(12) United States Patent
Sekiya et al.

(10) Patent No.: US 10,454,528 B2
(45) Date of Patent: Oct. 22, 2019

(54) RELAY DEVICE FOR RELAYING DATA BETWEEN COMMUNICATION CABLES

(71) Applicants: SOKEN, INC., Nishio, Aichi-pref. (JP); DENSO CORPORATION, Kariya, Aichi-pref. (JP)

(72) Inventors: Youhei Sekiya, Nishio (JP); Hiroyuki Mori, Nishio (JP); Yoshifumi Kaku, Kariya (JP); Hironobu Akita, Kariya (JP)

(73) Assignees: SOKEN, INC., Nishio (JP); DENSO CORPORATION, Kariya (JP)

( * ) Notice: Subject to any disclaimer, the term of this patent is extended or adjusted under 35 U.S.C. 154(b) by 66 days.

(21) Appl. No.: 15/820,495

(22) Filed: Nov. 22, 2017

(65) Prior Publication Data
US 2018/0248583 A1 Aug. 30, 2018

(30) Foreign Application Priority Data
Feb. 28, 2017 (JP) .................................. 2017-36126

(51) Int. Cl.
*H04B 3/36* (2006.01)
*H04B 3/23* (2006.01)
*H04B 7/185* (2006.01)
*B60R 16/023* (2006.01)

(52) U.S. Cl.
CPC .................. *H04B 3/36* (2013.01); *H04B 3/23* (2013.01); *H04B 7/18584* (2013.01); *B60R 16/023* (2013.01)

(58) Field of Classification Search
CPC ......... H04B 3/36; H04B 3/23; H04B 7/18584
See application file for complete search history.

(56) References Cited

U.S. PATENT DOCUMENTS

| | | | | |
|---|---|---|---|---|
| 2007/0248024 | A1* | 10/2007 | Conway | ................... H04B 3/23 370/252 |
| 2008/0205661 | A1* | 8/2008 | Kim | .......................... H04B 3/23 381/66 |
| 2011/0043393 | A1* | 2/2011 | Tamura | ............... H03M 1/1038 341/119 |

(Continued)

FOREIGN PATENT DOCUMENTS

JP 2007-306289 A 11/2007

*Primary Examiner* — Peter Chen
(74) *Attorney, Agent, or Firm* — Posz Law Group, PLC

(57) ABSTRACT

A relay device for data between communication cables having a signal line in full duplex communication, includes: communication units connected to the communication cables; and a main controller executing a relay process of the data. Each communication unit includes: an input/output unit of an analog signal; an analog/digital converter converting the analog signal into a digital signal; a generator generating another digital signal based on another analog signal input to another communication unit; and an echo canceller calculating a filter coefficient based on the other digital signal and the digital signal, and executing a cancellation process of removing a component derived from the other digital signal from the digital signal according to the filter coefficient. The communication unit or the main control unit includes a sign determination unit determining based on a time change of the filter coefficient whether a sign of disconnection exists in the signal line.

14 Claims, 10 Drawing Sheets

(56) References Cited

U.S. PATENT DOCUMENTS

| | | | | |
|---|---|---|---|---|
| 2012/0115412 A1* | 5/2012 | Gainey | ............... | H04B 3/23 |
| | | | | 455/7 |
| 2013/0343437 A1* | 12/2013 | Li | ............... | H04B 7/15585 |
| | | | | 375/211 |
| 2015/0051850 A1* | 2/2015 | Pan | ............... | G01R 31/343 |
| | | | | 702/58 |
| 2015/0280593 A1* | 10/2015 | Ando | ............... | H02M 1/42 |
| | | | | 363/17 |

* cited by examiner

RELAY DEVICE FOR RELAYING DATA BETWEEN COMMUNICATION CABLES

CROSS REFERENCE TO RELATED APPLICATION

This application is based on Japanese Patent Application No. 2017-36126 filed on Feb. 28, 2017, the disclosure of which is incorporated herein by reference.

TECHNICAL FIELD

The present disclosure relates to a relay device having a function of detecting disconnection of a signal line of a communication cable.

BACKGROUND

Patent Literature 1 discloses a communication system that includes multiple communication nodes which are connected to a communication bus having a two-line configuration, in which an average voltage between two signal lines configuring the communication bus is monitored to detect disconnection of the communication bus. More specifically, when the average voltage between the signal lines becomes equal to or larger than a predetermined threshold, it is determined that a disconnection occurs in the communication bus.

Patent Literature 1 does not consider any configuration for detecting a sign of disconnection of a communication cable at all. In order to further enhance the reliability of a communication, it is preferable that a sign of disconnection of the communication cable can be detected. This is because if the sign of disconnection can be detected, it is possible to take measures such that a communication path is switched to another before the disconnection occurs.

[Patent Literature 1] JP-A-2007-306289

SUMMARY

It is an object of the present disclosure to provide a relay device capable of determining whether disconnection is likely to occur in a communication cable.

According to a first aspect of the present disclosure, a relay device for relaying data between a plurality of communication cables having at least one signal line in a vehicle communication system for providing a communication protocol with a full duplex communication through the at least one signal line, includes: a plurality of communication units that are connected to a plurality of the communication cables, respectively; and a main controller that is mutually connectable to the plurality of communication units, and executes a relay process of relaying the data between the plurality of communication units. Each of the plurality of communication units includes: an input and output unit that inputs and outputs an analog signal through the at least one signal line of one of the plurality of communication cables which is defined as a connection cable and connected to one of the communication units; an analog-to-digital converter that converts the analog signal output from the input and output unit into a digital signal, and outputs the digital signal; a generator that generates an other digital signal to be output to the at least one signal line based on an other analog signal input to an other one of the plurality of communication units; and an echo canceller that sequentially calculates a filter coefficient to be used in an adaptive filter based on the other digital signal output from the generator and the digital signal output from the analog-to-digital converter, and executes a cancellation process of removing a component of the digital signal from the digital signal according to the filter coefficient, the component of the digital signal being derived from the other digital signal of the generator. The one of the communication units or the main control unit includes a sign determination unit that determines based on a time change of the filter coefficient determined by the echo canceller whether a sign of disconnection exists in the at least one signal line connected to the one of the communication units including the echo canceler.

Because the relay device is used in the communication system employing the communication method in which one signal line is used for the full duplex communication, a signal transmitted by the other device as well as the transmission signal transmitted by the relay device per se and the reflected signal (hereinafter referred to as a transmission signal component) derived from the transmission signal reflected and returned in the transmission process are superimposed on the received signal of the relay device. In the present specification, the received signal is an analog signal input from the signal line to the input and output unit, and the transmission signal corresponds to a signal that is output to the signal line by the input and output unit based on the digital signal output from the generator.

The echo canceller is configured to remove the transmission signal component included in the received signal, and the filter coefficient calculated by the echo canceller is determined according to the transmission signal component included in the received signal. A magnitude, a phase and the like of the reflected signal included in the transmission signal component are determined according to the electric characteristics of the signal line. Further, in the vehicle communication system in which an external disturbance such as vehicle body vibrations steadily acts on a communication cable, the electric characteristics of the signal line change with time. Therefore, the filter coefficient calculated by the echo canceller is a parameter that dynamically changes and is originally sequentially updated.

However, as a result of testing the behavior of the filter coefficient in the case where the signal line is disconnected due to the vibrations of the vehicle body or the like, the inventors have found that when the signal line is disconnected due to the vibrations of the vehicle body or the like, an event that the update of the filter coefficient temporarily stops occurs as a sign of the disconnection. It is estimated that this is because instantaneous disconnection (hereinafter referred to as "instantaneous disconnection") is likely to occur as a predictor of the disconnection of the signal line due to vibrations of the vehicle body or the like, and it is estimated that a transmission line viewed from the echo canceller becomes no-load to keep the reflection coefficient to a constant value (specifically, 1) while the instantaneous disconnection occurs, In other words, whether the filter coefficient calculated by the echo canceller is dynamically changing, or not, can function as an index for determining whether the signal line is likely to be disconnected, or not. Since the signal line is a component of the communication cable, the determination of whether the signal line is likely to be disconnected, or not, corresponds to the determination of whether the communication cable is likely to be disconnected, or not. Therefore, according to the configuration described above, it can be determined whether the communication cable is likely to be disconnected, or not, based on the temporal change in the filter coefficient sequentially calculated by the echo canceller.

According to a second aspect of the present disclosure, a relay device for relaying data between a plurality of communication cables having at least one signal line in a vehicle communication system for providing a communication protocol with a full duplex communication through the at least one signal line, includes: a plurality of communication units that are connected to a plurality of the communication cables, respectively; and a main controller that is mutually connectable to the plurality of communication units, and executes a relay process of the data between the plurality of communication units. Each of the plurality of communication units includes: an input and output unit that inputs and outputs an analog signal through the at least one signal line of one of the plurality of communication cables which is defined as a connection cable and connected to one of the communication units; a low frequency signal transmission unit that outputs a low frequency signal, which has a frequency lower than a frequency of a data communication, through the at least one signal line; and a low frequency signal receiving unit that receives an other low frequency signal outputted through the at least one signal line from an other relay device connected at an opposite end of the at least one signal line. The one of the communication units or the main control unit includes a sign determination unit that detects an instantaneous disconnection of the at least one signal line connected to the low frequency signal receiving unit based on a reception state of the other low frequency signal in the low frequency signal receiving unit, and determines based on an occurrence frequency of the instantaneous disconnection whether a sign of disconnection exists in the one of the communication cables including the at least one signal line.

In the configuration described above, if the disconnection or the instantaneous disconnection occurs in the signal line, the low frequency signal receiving unit cannot receive the low frequency signal transmitted by the other device, which is another device connected at an opposite end of the signal line. In other words, a reception situation of the low frequency signal by the low frequency signal receiving unit functions as index information for determining whether the signal line is instantaneously disconnected, or not.

Further, as a result of carrying out various tests, the inventors have obtained the knowledge that if the signal line is disconnected due to the vibrations of the vehicle body or the like, the instantaneous disconnection can occur as a sign of the disconnection at a high frequency. In other words, the occurrence frequency of the instantaneous disconnection can function as an index for determining whether the signal line is likely to be disconnected, or not. Since the signal line is a component of the communication cable, the determination of whether the signal line is likely to be disconnected, or not, corresponds to the determination of whether the communication cable is likely to be disconnected, or not. Therefore, according to the above configuration, it can be determined whether the communication cable is likely to be disconnected, or not.

According to a third aspect of the present disclosure, a relay device for relaying data between a plurality of communication cables having at least one signal line in a vehicle communication system for providing a communication protocol with a full duplex communication through the at least one signal line, includes: a plurality of communication units that are connected to a plurality of the communication cables, respectively; and a main controller that is mutually connectable to the plurality of communication units, and executes a relay process of the data between the plurality of communication units. Each of the plurality of communication units includes an S parameter measurement unit that outputs a predetermined detection signal through the at least one signal line of one of the plurality of communication cables which is defined as a connection cable and connected to one of the communication units, and measure an S parameter indicative of an electric characteristic of the at least one signal line. The one of the communication units or the main control unit includes a sign determination unit that determines based on a time change of the S parameter measured by the S parameter measurement unit whether a sign of disconnection exists in the one of the communication cables connected to the one of the communication units including the S parameter measurement unit.

Since the S parameter measured by the S parameter measurement unit indicates the electric characteristic of the signal line accommodated in the communication cable, the S parameter can fluctuate relatively greatly when the signal line is instantaneously disconnected. In other words, the S parameter functions as the index information for determining whether the signal line is instantaneously disconnected, or not.

In addition, as described above, as a result of implementing various tests, the present inventors have found out that the occurrence frequency of instantaneous disconnection can function as the index for determining whether the signal line is likely to be disconnected, or not. Therefore, according to the configuration described above, the occurrence frequency of the instantaneous disconnection can be specified based on the temporal change in the S parameter, and whether the communication cable is likely to be disconnected, or not, can be determined with the use of the specified result.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
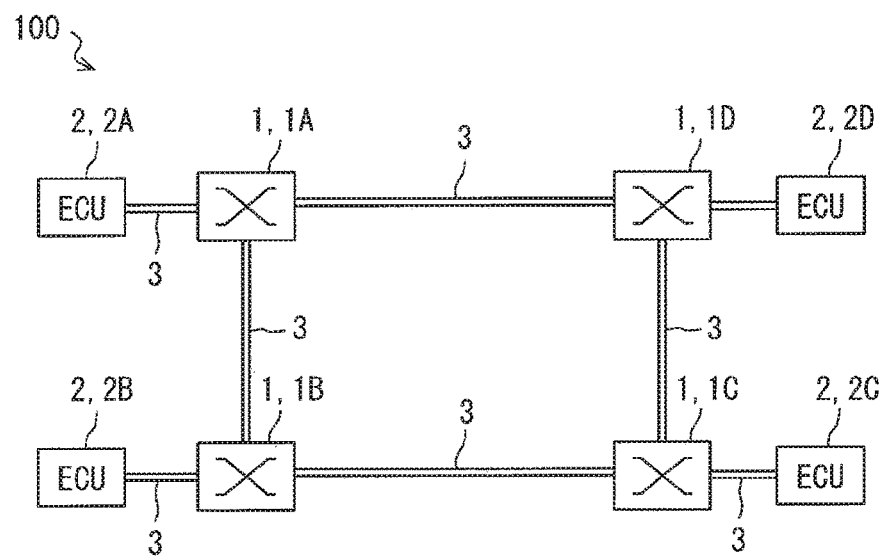
FIG. 1 is a block diagram illustrating a schematic configuration of a vehicle communication system.

Hereinafter, a first embodiment of the present invention will be described with reference to the accompanying drawings. FIG. 1 is a diagram showing an example of a schematic configuration of a vehicle communication system 100 according to the first embodiment. The vehicle communication system 100 is a system which is installed in a vehicle such as a passenger car and provides a communication network in the vehicle as a local network.

As shown in FIG. 1, the vehicle communication system 100 includes multiple relay devices 1, multiple ECUs (electronic control units) 2, and multiple communication cables 3. In the example shown in FIG. 1, the vehicle communication system 100 includes four relay devices 1A to 1D as the relay devices 1. The four relay devices 1A to 1D are connected to each other through the multiple communication cables 3 so as to form a ring type network topology. Each of the relay devices 1 is connected with the communication cables 3 for connection to the respective ECUs 2 as well as the communication cable 3 connected to each ECU 2.

In FIG. 1, the three communication cables 3 are connected to each relay device 1, but the number of communication cables 3 connected to the relay device 1 is not limited to three. Four or more communication cables may be connected to the relay device 1. The number of communication cables 3 to which the relay device 1 can be connected (hereinafter, the number of connectable cables 3) may be appropriately designed. The relay device 1 is provided with a number of insertion ports (so-called ports) corresponding to the connectable number. It is assumed that the connectable number of the relay device 1 according to the present embodiment is set to 3.

Each of the ECUs 2 is a device that transmits data directed to another ECU 2 and receives data transmitted from another ECU 2. Each of the ECUs 2 can mutually transmit and receive data to and from another ECU 2 through the communication cables 3 and the relay devices 1. The relay device 1 is a device that relays data between the communication cables 3.

As a physical layer of the vehicle communication system 100, various methods such as BroadR-Reach (registered trademark) can be employed. In the present embodiment, as an example, it is assumed that the communication cable 3 is realized by using a set of twisted pair cables formed by combining two signal lines. Each of the ECUs 2 is configured so as to perform transmission and reception at the same time (that is, to enable a full duplex communication) on each of the two signal lines configuring the twisted pair cables. In other words, each of the ECUs 2 is configured to enable the full duplex communication with one signal line. Accordingly, the relay device 1 also has a configuration for performing the full duplex communication with one signal line.

Figure 2:
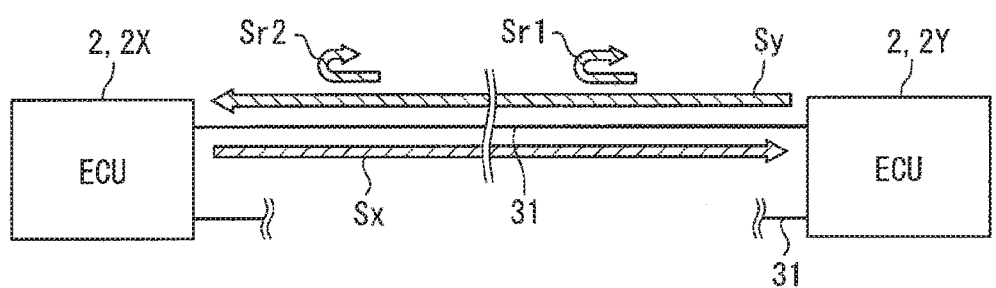
FIG. 2 is a diagram illustrating a communication method in the vehicle communication system.

In the configuration in which the ECUs 2 perform the full duplex communication with the use of one signal line, as shown in FIG. 2, a signal Sx transmitted by one ECU 2 (hereinafter referred to as a first ECU 2X) and a signal Sy transmitted by the other ECU 2 (hereinafter referred to as a second ECU 2Y) flow on one signal line 31 provided in the communication cable 3, Therefore, the second ECU 2Y acquires a signal (that is, Sx+Sy) in which the transmission signal Sy of the second ECU 2Y is superimposed on the signal Sx transmitted by the first ECU 2X as the received signal. Also, the signals Sr1 and Sr2 returned by reflecting the transmission signal of the second ECU 2Y in a transmission process can be superimposed on the received signal. In FIG. 2, illustration of the relay devices 1 is omitted.

For that reason, each of the ECUs 2 includes an echo canceller as a configuration for performing the full duplex communication with the use of one signal line. The echo canceller is configured to remove a component derived from the transmission signal from the received signal. Similarly to the ECU 2, each of the relay devices 1 also includes an echo canceller 125 as a configuration for performing the full duplex communication with the use of one signal line. The echo canceller 125 will be described later separately. Since the echo canceller included in the ECU 2 is the same as the echo canceller 125 included in the relay device 1, a description of the echo canceller included in the ECU 2 will be omitted.

The network topology of the vehicle communication system 100 described above is an example and is not limited to the example. The network topology of the vehicle communication system 100 may be of a mesh type, a star type, a bus type or the like. The number of the ECUs 2 connected to the vehicle communication system 100 and the relay devices 1 provided in the vehicle communication system 100 may be appropriately designed. Further, the communication cable 3 may be a cable having multiple sets (for example, two sets or four sets) of twisted pair cables.

<Configuration of the Relay Device 1>

Figure 3:
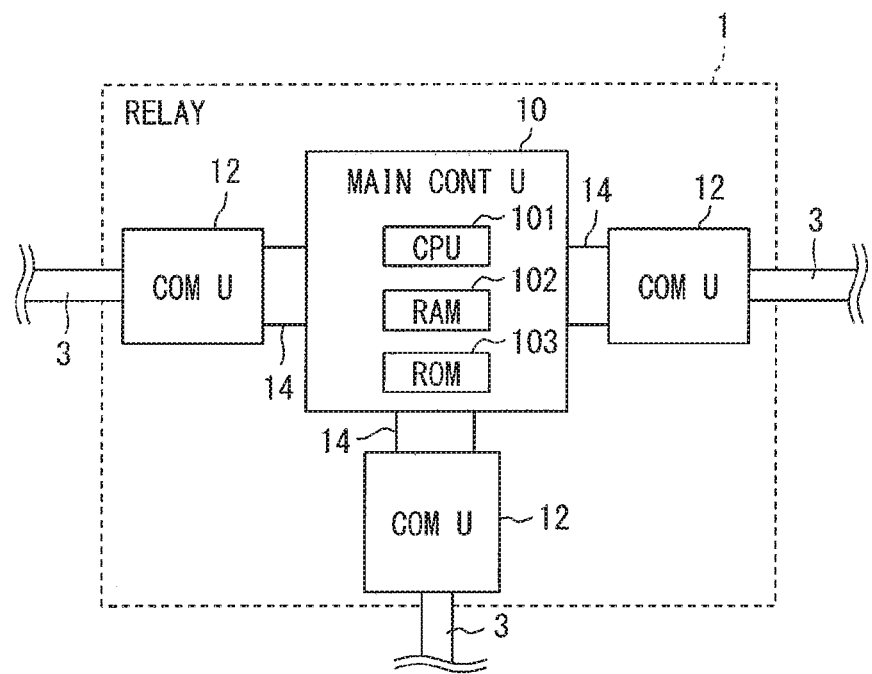
FIG. 3 is a block diagram illustrating an example of a schematic configuration of a relay device.

Now, a configuration of the relay device 1 according to the present embodiment will be described with reference to FIG. 3. FIG. 3 is a diagram showing a schematic configuration of the relay device 1. As shown in FIG. 3, the relay device 1 includes a main control unit 10, multiple communication units 12, and multiple connection units 14.

The main control unit 10 is configured to control the operation of the relay device 1, and is realized with the use of, for example, a computer. In other words, the main control unit 10 is realized with the use of a CPU 101, a RAM 102, a ROM 103, and the like. The main control unit 10 performs a process (so-called routing) for transferring data input from a certain communication cable 3 to a predetermined output destination. The output destination of the data input from the communication cable 3 may be implemented with the use of, for example, destination information described in a header of the data, a predetermined routing table, and the like. Since the routing per se may be carried out by a well-known method, a detailed explanation of the routing will be omitted.

The communication unit 12 is configured to be connected to the communication cable 3. The relay device 1 includes the communication units 12 (three in this example) of the number corresponding to the connectable number set in the relay device 1. One communication cable 3 is connected to each communication unit 12. Briefly, the communication unit 12 is configured to convert an analog signal input from the communication cable (hereinafter referred to as a connection cable) 3 connected to the subject communication unit 12 into a digital signal and output the converted digital signal to the main control unit 10, and convert the digital signal input from the main control unit 10 into an analog signal and output the converted analog signal to the connection cable 3. Details of the communication unit 12 will be described later.

The connection unit 14 is configured to connect the communication unit 12 and the main control unit 10 so as to be communicatable with each other. The connection unit 14 is provided between each communication unit 12 and the main control unit 10. The connection unit 14 may be realized with the use of a configuration well known as an MII (media Independent Interface), for example.

<Configuration of the Communication Unit 12>

Figure 4:
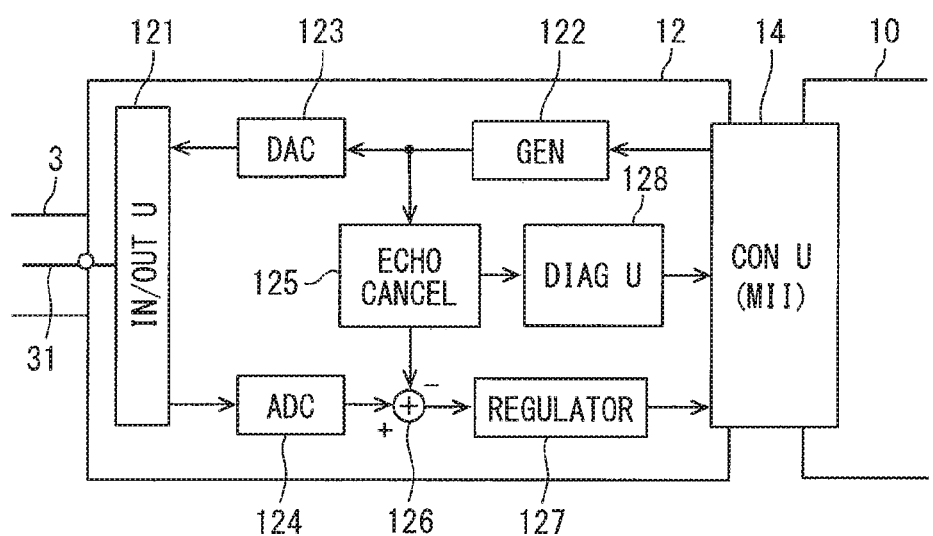
FIG. 4 is a block diagram illustrating a schematic configuration of a communication unit according to a first embodiment.

Next, the configuration and functions of the communication unit 12 will be described with reference to FIG. 4. FIG. 4 is a diagram showing an example of a schematic configuration of the communication unit 12. As shown in FIG. 4, the communication unit 12 includes an input and output unit 121, a generator 122, a digital to analog converter (hereinafter referred to as DAC) 123, an analog to digital converter (ADC) 124, an echo canceller 125, a subtractor 126, a regulator 127, and a diagnosis unit 128.

Hereinafter, for convenience sake, the other relay device 1 or ECU 2 which is located on an opposite side through the connection cable 3 is referred to as the other device. The other device corresponds to another relay device 1 or ECU 2 connected through the connection cable 3. FIG. 4 shows a configuration for one signal line 31 included in the communication cable 3. It is assumed that the other signal lines 31 also have the same configuration. One configuration may be shared by the multiple signal lines 31. Hereinafter, among the multiple signal lines 31 of the communication cable 3, one signal line 31 to be described is referred to as a target signal line 31.

The input and output unit 121 is configured to function as an interface for inputting and outputting the analog signal to and from the connection cable 3 (more specifically, the target signal line 31). The input and output unit 121 may be realized with the use of a configuration known as MDI (media dependent interface), for example. The input and output unit 121 is connected to the DAC 123 and the ADC 124, respectively. The input and output unit 121 outputs the analog signal input from the DAC 123 to the target signal line 31.

Further, the input and output unit 121 outputs the analog signal input from the target signal line 31 to the ADC 124. The input and output unit 121 includes a high-pass filter that cuts off a signal having a frequency sufficiently lower than a frequency (for example, 10 MHz) used for a communication between the ECUs 2 on a path through which a signal output to the ADC 124 passes. For example, the input and output unit 121 is assumed to have a high-pass filter whose cutoff frequency is set to 100 kHz. The high-pass filter prevents a signal having a predetermined cutoff frequency or lower which is superimposed on the target signal line 31 from being transmitted to a circuit (for example, the ADC 124) inside the communication unit 12.

The generator 122 is configured to generate a digital signal (so-called symbol) to be output to the target signal line 31 based on the digital signal input from the main control unit 10. The generator 122 outputs the digital signal generated based on the digital signal input from the main control unit 10 to the DAC 123. The output signal of the generator 122 is also referred to by the echo canceller 125.

The digital signal input from the main control unit 10 corresponds to a digital signal obtained by subjecting the analog signal input to the relay device 1 from another communication cable 3 different from the communication cable 3 accommodating the target signal line 31 to analog to digital conversion. The generator 122 may be implemented with the use of one or more ICs. The generator 122 may be realized by execution of software by the CPU.

The DAC 123 is configured to convert the digital signal input from the generator 122 into an analog signal and outputs the converted analog signal to the input and output unit 121. The ADC 124 is configured to convert the analog signal input from the input and output unit 121 into a digital signal and outputs the converted digital signal to the subtractor 126. The ADC 124 corresponds to an analog to digital conversion unit defined in the claims. The DAC 123 and the ADC 124 may be realized with the use of one or multiple ICs. The DAC 123 and the ADC 124 may be realized by execution of software by the CPU.

Figure 5:
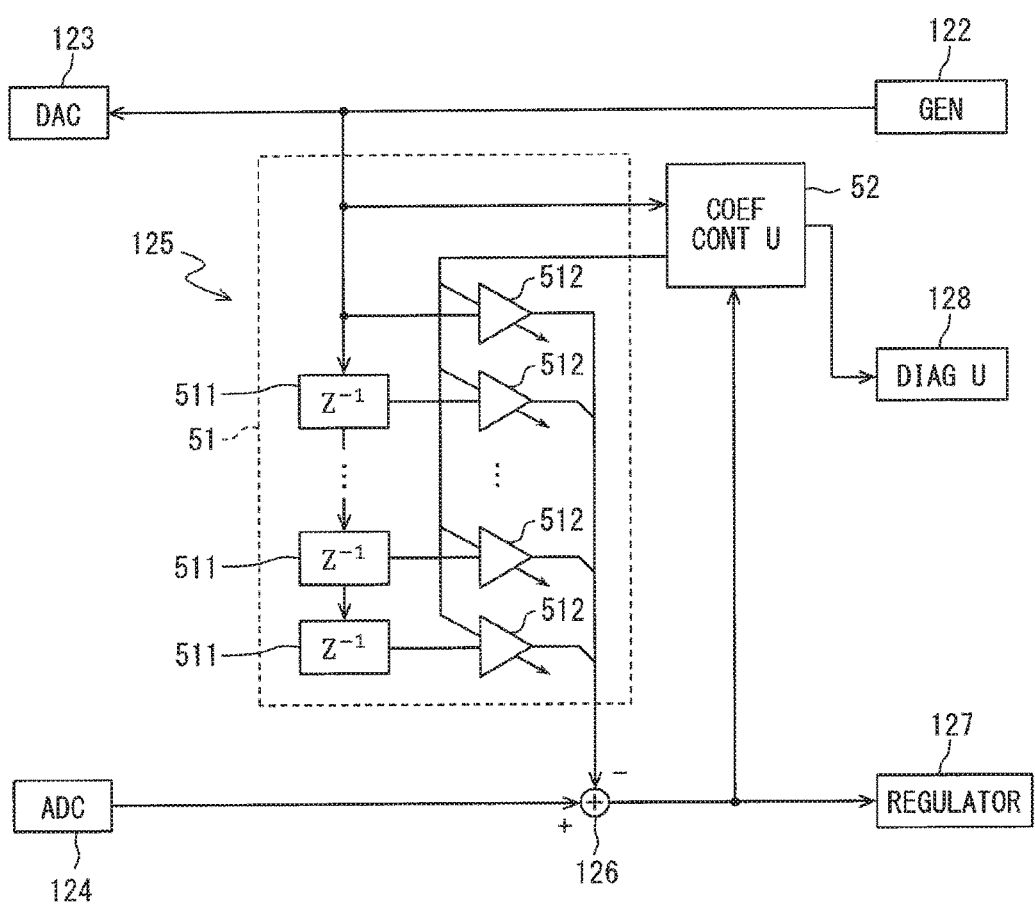
FIG. 5 is a block diagram illustrating a configuration of an echo canceller.

The echo canceller 125 has a configuration for removing a component (hereinafter referred to as a transmission signal component) derived from the transmission signal output by the communication unit 12 to the target signal line 31 from the analog signal (in other words, the received signal) output from the ADC 124. As described at the beginning, the transmission signal component includes not only the transmission signal per se but also a component (that is, the echo component) returned by reflection in the transmission process. For example, as shown in FIG. 5, the echo canceller 125 may be implemented with the use of an adaptive filter. The adaptive filter includes an FIR filter 51 having a predetermined number of taps and a coefficient control unit 52.

The FIR filter 51 is a known finite impulse response filter. The FIR filter 51 includes delayers 511 of the number corresponding to the number of taps and multipliers 512 equal in number to the delayers 511. The delayer 511 is configured to delay the input signal by a predetermined unit time and output the input signal. The multiple delayers 511 are cascade-connected to each other. The number of taps may be appropriately designed, and in this example, it is assumed that the number of taps is set to 12, for example.

Each multiplier 512 is configured to output a signal obtained by amplifying and attenuating an input signal at a predetermined ratio. The multiple multipliers 512 are connected to the respective different delayers 511. The output signal of the connected delayer 511 is input to each multiplier 512. In other words, the multiplier 512 outputs the signal obtained by amplifying and attenuating the output signal of the delayer 511 at the predetermined ratio. The ratio (so-called filter coefficient) for adjusting the amplitude of the input signal of each multiplier 512 is controlled by a coefficient control unit 52 to be described later.

The FIR filter 51 outputs a signal obtained by adding all the output signals of the respective multipliers 512 to the subtractor 126. The subtractor 126 is configured to output a signal obtained by subtracting the output signal of the echo canceller 125 (specifically, the FIR filter 51) from the output signal of the ADC 124. The output signal of the subtractor 126 is input to the regulator 127, and is referred to the coefficient control unit 52.

For the sake of convenience below, a set of one delayer 511 and the multiplier 512 connected to the delayer 511 will also be referred to as a tap. In the respective taps, a tap at the most upstream side is numbered 1 and tap numbers are assigned in order from upstream to downstream. A tap whose tap number is n (n is a natural number) means the n-th tap counting from the most upstream tap. The most upstream tap is the tap closest to the generator 122.

The coefficient control unit 52 is configured to control the filter coefficient of the FIR filter 51 so that the transmission signal component is removed from the output signal of the subtractor 126 with reference to the output signal of the generator 122 and the output signal of the subtractor 126. The coefficient control unit 52 may be realized with the use of an IC or the like, or may be realized by causing the CPU to execute predetermined software.

The coefficient control unit 52 sequentially calculates the filter coefficient of each tap (for example, every several is seconds) so that the transmission signal component is removed from the output signal of the subtractor 126, and regulates an amplification and an attenuation factor of each multiplier 512. In addition, the coefficient control unit 52 sequentially provides data (hereinafter referred to as filter coefficient data) indicating the filter coefficient for each tap sequentially calculated to the diagnosis unit 128. A well-known algorithm can be applied to a calculation method itself of the filter coefficient per tap. For that reason, in this example, a detailed description of the method of calculating the filter coefficient will be omitted.

Meanwhile, a transmission signal component (particularly, an echo component) included in the output signal of the ADC 124 is determined according to a state of the target signal line 31 (specifically, an electric characteristic such as an impedance). Therefore, the filter coefficient for each tap calculated by the coefficient control unit 52 functions as information indicating the state of the target signal line 31. The state of the target signal line 31 also includes a connection state of the target signal line 31 with the other device. Further, when the vehicle is traveling, the electric characteristics of the connection cable 3 dynamically change due to a disturbance such as vibrations attributable to the traveling of the vehicle. For that reason, the filter coefficient calculated by the coefficient control unit 52 also changes sequentially.

Since one signal line 31 configures one twisted pair cable, the state of the signal line 31 corresponds to a state of the twisted pair cable including the signal line 31. In addition, since the twisted pair cable is a component of the connection cable 3, the state of the twisted pair cable corresponds to a state of the connection cable 3. In other words, the state of the signal line 31 corresponds to a state of the connection cable 3.

The regulator 127 has a configuration (so-called equalizer) that generates a signal in which the frequency, the phase, and the like of the output signal of the subtractor 126 are regulated. The output signal of the regulator 127 is provided to the main control unit 10 through the connection unit 14.

The diagnosis unit 128 determines whether there is a sign of disconnection in the target signal line 31, or not, that is, whether the target signal line 31 is likely to be disconnected, or not, based on the filter coefficient data sequentially provided from the echo canceller 125 (specifically, the coefficient control unit 52). In the present specification, the disconnection refers to an event in which a state where a communication with the other device cannot be implemented continues until a restoration work by an administrator or the like is performed due to the disconnection of the signal line 31, falling off of the connector, or the like. An event (that is, an instantaneous disconnection state) in which a communication cannot be temporarily performed with the other device due to a temporary contact failure or the like is described as an instantaneous disconnection. The disconnection and the instantaneous disconnection differ from each other depending on whether to return naturally from a state in which the communication is disabled to a state in which the communication is enabled, or not.

Figure 6:
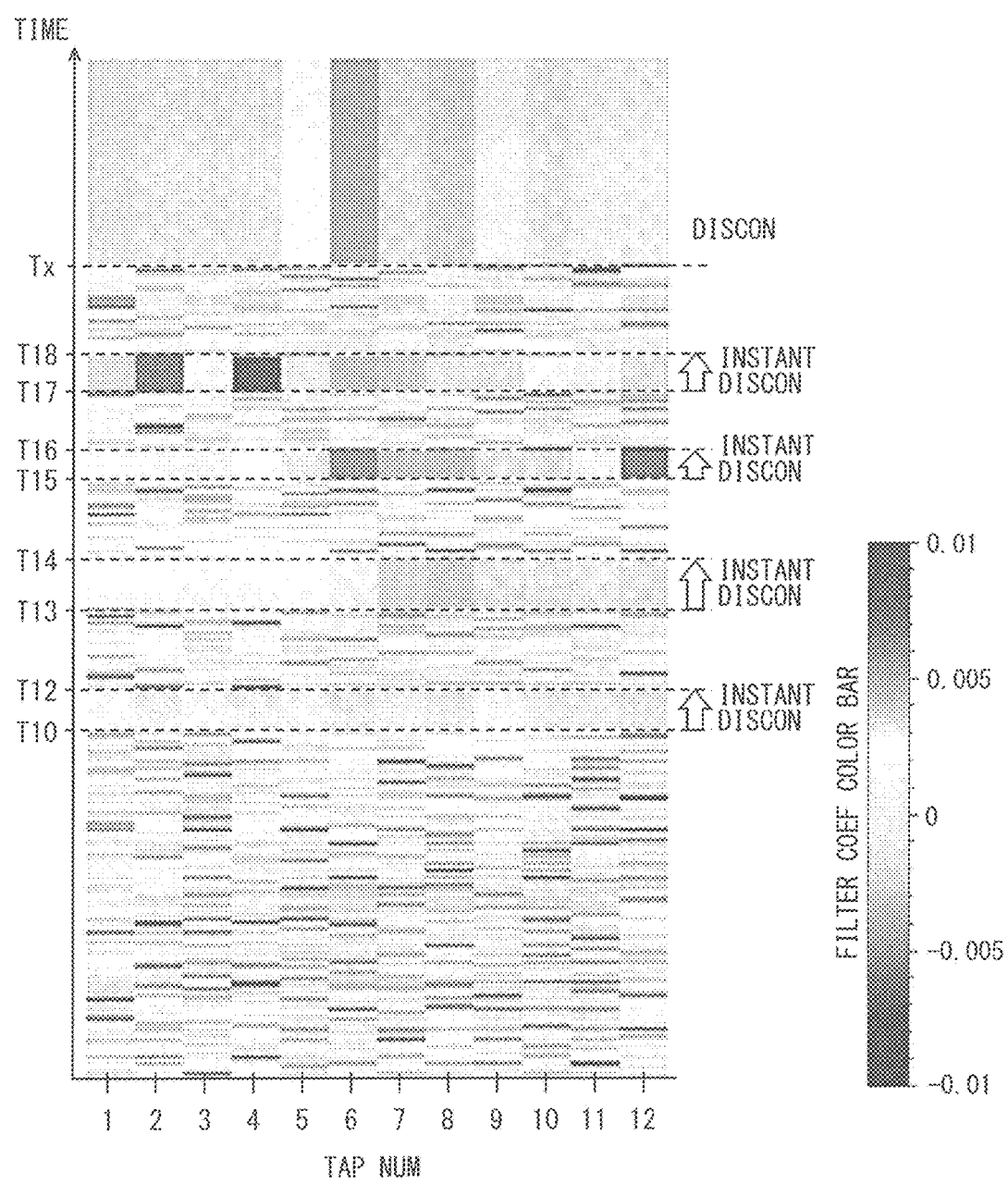
FIG. 6 is a diagram illustrating a relationship between a filter coefficient and a connection state of a signal line in a state in which disconnection is likely to occur.
Figure 7:
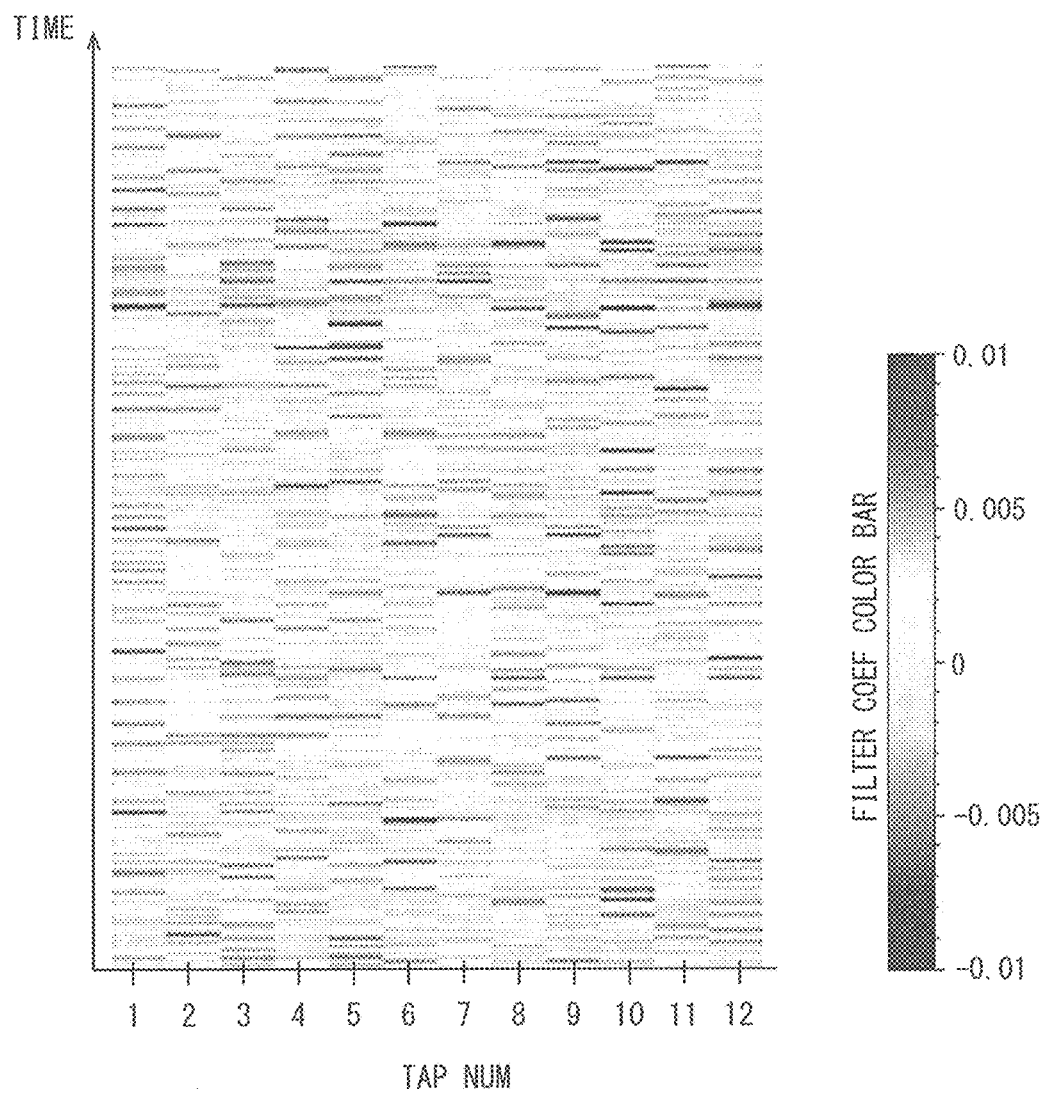
FIG. 7 is a diagram illustrating the relationship between the filter coefficient and the connection state of the signal line.

The principle of determining whether there is a sign of the disconnection on the target signal line 31 based on the filter coefficient data by the diagnosis unit 128 will be described with reference to FIGS. 6 and 7. FIG. 6 is a diagram showing the result of testing a temporal change in the filter coefficient until the disconnection occurs due to the vibrations occurring while the vehicle is traveling. FIG. 7 is a diagram showing the result of testing a temporal change in the filter coefficient when the target signal line 31 is in a sound state. In the diagrams shown in FIGS. 6 and 7, a horizontal axis represents the tap number, and a vertical axis represents a passage of time upward from the bottom. Symbol Tx in FIG. 6 represents a time point at which the disconnection occurs.

When the connection cable 3 is not disconnected, the electric characteristics of the connection cable 3 dynamically change due to external disturbances such as the vibrations attributable to the traveling of the vehicle and electromagnetic waves. For that reason, as shown in FIG. 6, the filter coefficient changes dynamically. In addition, when the disconnection and the instantaneous disconnection occur, the transmission line becomes no-load and the transmission signal is totally reflected. In other words, when the disconnection and the instantaneous disconnection occur, the reflection coefficient of the transmission line is kept to a constant value (specifically, 1). Further, the filter coefficient in the echo canceller 125 is determined according to the degree of reflection of the transmission signal (in other words, the reflection coefficient), Therefore, when the disconnection and the instantaneous disconnection occur, the filter coefficient calculated by the coefficient control unit 52 is held at a constant value.

For that reason, a case in which the value of the filter coefficient does not change for a fixed time means that the instantaneous disconnection and the disconnection occur. More specifically, FIG. 6 shows that the instantaneous disconnection occurs between times T11 and T12, between times T13 and T14, between times T15 and T16, and between times T17 and T18.

As can be understood by comparing FIG. 6 with FIG. 7, in the case where the disconnection occurs due to the vibrations of the vehicle body, a disconnection state occurs after the instantaneous disconnection occurs multiple times in advance. Also, in a pattern that has not resulted in the disconnection in the test, the frequency of the instantaneous disconnection is relatively small. In other words, the occurrence frequency of the instantaneous disconnection, in other words, the frequency at which the updating of the filter coefficient temporarily stops can function as a determination index as to whether the connection cable 3 is likely to be disconnected, or not.

The diagnosis unit 128 according to the present embodiment is configured to determine whether there is a sign of the disconnection, or not, based on the above knowledge obtained by the test, and if the occurrence frequency of the instantaneous disconnection is equal to or more than a predetermined threshold, the diagnosis unit 128 determines that there is the sign of the disconnection. Further, if the occurrence frequency of the instantaneous disconnection is less than the predetermined threshold, the diagnosis unit 128 determines that there is no sign of the disconnection. The determination that there is the sign of the disconnection corresponds to the detection of the sign of the disconnection (in other words, predictor).

Whether the instantaneous disconnection has occurred, or not, is determined based on whether the filter coefficient has been updated, or not. For example, the diagnosis unit 128 temporarily determines that the instantaneous disconnection has occurred when the filter coefficient remains the same value for a predetermined period of time. When the filter coefficient is updated within a predetermined upper limit time from the occurrence of the instantaneous disconnection, the diagnosis unit 128 establishes the determination that the instantaneous disconnection has occurred. If the filter coefficient has not been updated even after the predetermined upper limit time has elapsed, the diagnosis unit 128 determines that not the instantaneous disconnection but the disconnection has occurred. The diagnosis unit 128 corresponds to a sign determination unit defined in the claims.

<Connection State Diagnosis Process>

Figure 8:
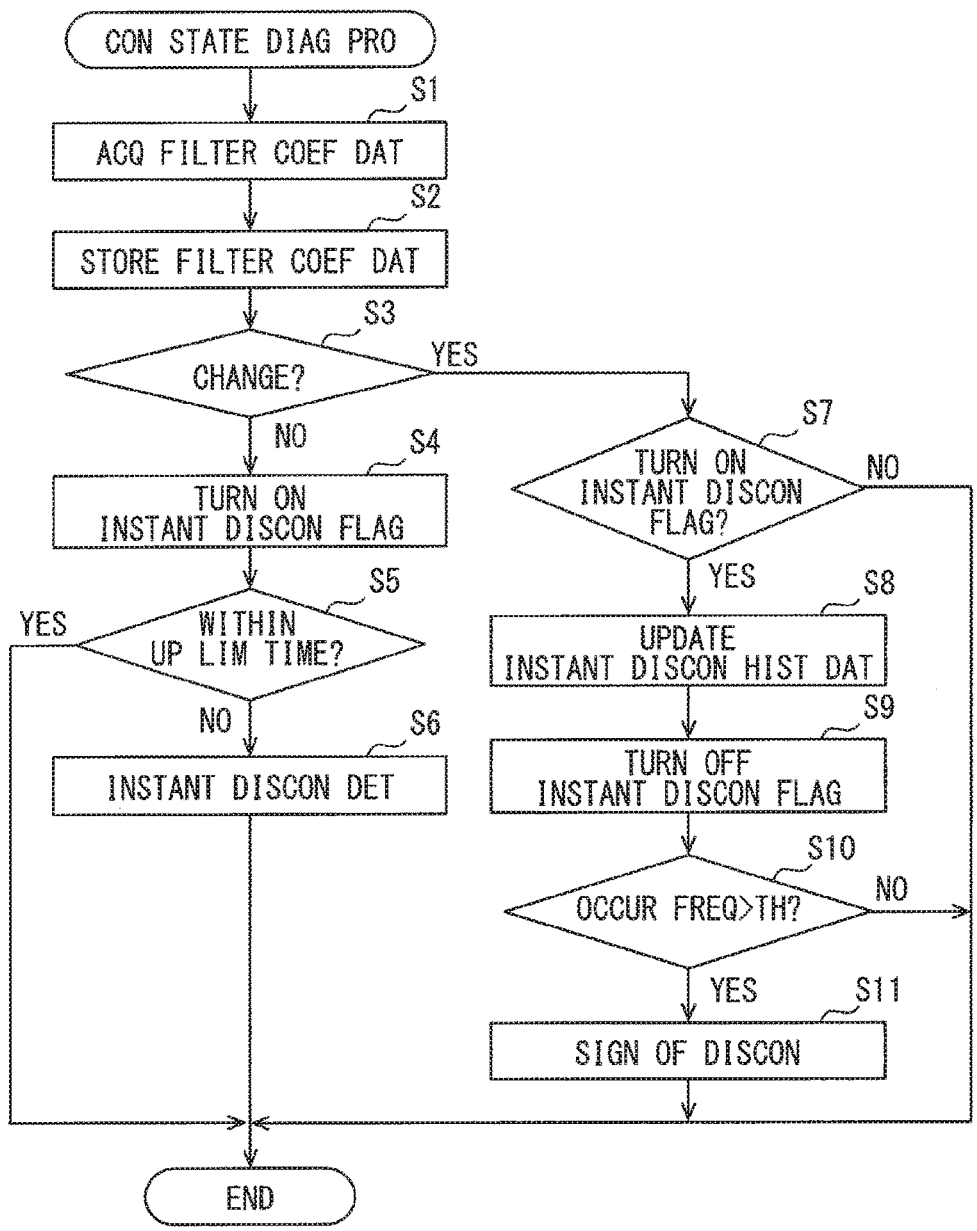
FIG. 8 is a flowchart illustrating a connection state diagnosis process.

Next, a connection state diagnosis process performed by the diagnosis unit 128 will be described with reference to a flowchart shown in FIG. 8. The connection state diagnosis process corresponds to a process of determining whether there is a sign of the disconnection in the target signal line 31, or not. The flowchart shown in FIG. 8 may be sequentially executed in a predetermined diagnosis cycle.

The diagnosis cycle may be appropriately designed according to an update interval of the filter coefficient in a range longer than the interval (hereinafter, update interval) at which the coefficient control unit 52 calculates the filter coefficient. For example, the diagnosis cycle may be set to a value that is five to ten times the update interval. As a matter of course, if the diagnosis cycle is shortened, the sign can be detected earlier, but a calculation load increases. The diagnosis cycle is set to a longer value within an allowable range, thereby being capable of reducing the calculation load.

First, in Step S1, the currently set filter coefficient data is acquired from the echo canceller 125 (more specifically, the coefficient control unit 52), and the flow proceeds to Step S2. In Step S2, the filter coefficient data acquired in Step S1 is stored in a memory not shown, and the flow proceeds to Step S3. The memory as a storage destination may be a storage medium having rewritable non-transitory entities such as a RAM. The filter coefficient data to be successively acquired may be sorted and stored in chronological order so that the latest data comes first, for example. Data that has been stored for a predetermined period of time has only to be sequentially discarded.

In Step S3, the filter coefficient data acquired in a previous connection state diagnosis process is compared with the filter coefficient data newly acquired this time, and it is determined whether the filter coefficient has changed, or not. If the filter coefficient has changed, an affirmative determination is made in Step S3 and the flow proceeds to Step S7. On the other hand, if the filter coefficient has not changed, a negative determination is made in Step S3 and the flow proceeds to Step S4.

In Step S4, an instantaneous disconnection flag which is a processing flag is set to ON, and the flow proceeds to Step S5. The instantaneous disconnection flag is a flag indicating whether updating of the filter coefficient is stopped, or not. When updating of the filter coefficient is stopped, the instantaneous disconnection flag is set to ON. When the updating of the filter coefficient is not stopped, the instantaneous disconnection flag is set to OFF. A case where the updating of the filter coefficient is stopped corresponds to a case where the instantaneous disconnection or the disconnection occurs as described above. It is assumed that the instantaneous disconnection flag is set to OFF immediately after the relay device 1 has been activated. The instantaneous disconnection flag may be reset to OFF each time the communication cable 3 is inserted or removed.

In Step S5, it is determined whether an elapsed time since the instantaneous disconnection flag is turned on falls within a predetermined upper limit time, or not. The upper limit time is a time for identifying whether the event occurring in the target signal line 31 is the instantaneous disconnection or the disconnection. The upper limit time corresponds to an upper limit value of a time that can be treated as the instantaneous disconnection. The time that can be treated as the instantaneous disconnection corresponds to a time allowed as a time during which a state in which the communication with the other device cannot be performed continues. A specific value of the upper limit time may be appropriately designed in consideration of the reliability of a communication network required for the vehicle communication system 100 or the like.

If the elapsed time since the instantaneous disconnection flag is turned on still falls within the upper limit time, an affirmative determination is made in Step S5 and the present flow is terminated. On the other hand, if the elapsed time since the instantaneous disconnection flag is turned on exceeds the upper limit time, a negative determination is made in Step S5 and the flow proceeds to Step S6. In Step S6, the target signal line 31 is determined to be disconnected and the present flow is terminated. If the target signal line 31 is determined to be disconnected, the fact is notified to the main control unit 10.

In Step S7, it is determined whether the instantaneous disconnection flag is on, or not. If the instantaneous disconnection flag is set to ON, an affirmative determination is made in Step S7 and the flow proceeds to Step S8. On the other hand, if the instantaneous disconnection flag is set to OFF, a negative determination is made in Step S7 and the present flow is terminated. A case where the determination in Step S7 is affirmative means a case where a change occurs in the filter coefficient in a state in which the instantaneous disconnection flag is set to ON. In other words, a case where the determination in Step S7 is affirmative means a case where a disconnection portion is reconnected (in other words, returned from the instantaneous disconnection). In addition, a case where a negative determination is made in Step S7 represents a state in which a change is observed in the filter coefficient in a state where the instantaneous disconnection flag is set to OFF. A case where the target signal line 31 is sound and the filter coefficient is sequentially updated corresponds to a pattern in which a negative determination is made in Step S7.

In Step S8, instantaneous disconnection history data is updated. The instantaneous disconnection history data is data indicating a history of instantaneous disconnection occurring in a past fixed time. For example, the instantaneous disconnection history data may be data indicating an occurrence time, a duration, and the like of the instantaneous disconnection occurring in the past fixed time. In Step S8, the data on the instantaneous disconnection newly observed this time is added to the instantaneous disconnection history data, and the flow proceeds to Step S9. The instantaneous disconnection history data may be stored in a rewritable memory not shown as with the filter coefficient data.

In Step S9, the instantaneous disconnection flag is set to OFF and the flow proceeds to Step S10. In Step S10, it is determined whether the number of instantaneous disconnection occurrences (in other words, the instantaneous disconnection occurrence frequency) in a predetermined past period of time is equal to or more than a predetermined sign threshold value, or not, referring to the instantaneous disconnection history data. The sign threshold used in this example is a threshold for determining the sign of disconnection, and a specific value of the threshold can be appropriately designed. When the occurrence frequency is equal to or more than the sign threshold, the diagnosis unit 128 proceeds to Step S11, determines that there is the sign of disconnection, and terminates the present flow. On the other hand, when the occurrence frequency is less than the sign threshold, it is determined that there is no sign of disconnection and the present flow is terminated.

In the present embodiment, as an example, a mode of determining whether there is the sign of disconnection from the number of occurrences of instantaneous disconnection for the past fixed period of time, or not, is described. However, the present invention is not limited to the above configuration. When a total value of the duration of the instantaneous disconnection occurring in the past fixed period of time is equal to or more than the predetermined threshold, it may be determined that there is the sign of disconnection. Further, it may be determined whether there is the sign of disconnection, or not, with the use of both the number of occurrences of the instantaneous disconnection in the past fixed period of time and the total value of the duration of the instantaneous disconnection generated in the past fixed period of time.

Summary of First Embodiment

According to the configuration described above, the occurrence of the instantaneous disconnection is detected based on whether the filter coefficient has been updated, or not. The sign of instantaneous disconnection is detected based on the occurrence frequency of the instantaneous disconnection for a last fixed period of time, on the basis of the knowledge that the frequency of occurrence of the instantaneous disconnection is relatively high immediately before the disconnection occurs due to the vehicle body vibrations.

With the configuration described above, it is possible to determine whether the disconnection of the target signal line 31 is predicted, or nor, in other words, whether the target signal line 31 is likely to be disconnected, or not. In the case where it can be detected that the target signal line 31 is likely to be disconnected, it is possible to take an advance measure such as switching the communication path to another before the disconnection. Therefore, according to the configuration described above, the reliability of the vehicle communication system 100 can be improved.

Meanwhile, in order to perform the full duplex communication with the use of one signal line 31, the echo canceller 125 is indispensable for removing the transmission signal component from the received signal. In other words, according to the configuration described above, since the sign of disconnection can be detected with the use of the necessary configuration as the relay device 1 used in the vehicle communication system 100 described above, there is no need to newly add a circuit for detecting the sign of disconnection to the communication unit 12. As a result, it is possible to add a new function for detecting the sign of disconnection while reducing an increase in manufacturing cost of the relay device 1.

Although the embodiment of the present invention has been described above, the present invention is not limited to the embodiment described above, and various modifications described below are also encompassed in the technical scope of the present invention. Further, the embodiment can be variously modified without departing from the spirit of the present invention.

The members having the same functions as those in the members described in the above embodiment are denoted by the identical reference numerals, and a description of the same members will be omitted. Further, when referring to only a part of the configuration, the configuration of the embodiment described above can be applied to other portions.

Second Embodiment

Next, a vehicle communication system 100 according to a second embodiment of the present invention will be described with reference to the drawings. A main difference between the present embodiment and the first embodiment resides in a configuration for detecting an instantaneous disconnection. Hereinafter, the configuration and operation of the vehicle communication system 100 different from those in the first embodiment according to the second embodiment will be mainly described. The members having the same functions as those in the members described in the above first embodiment are denoted by the identical reference numerals, and a description of the same members will be omitted. Further, when referring to only a part of the configuration, the configuration of the embodiment described above can be applied to other portions.

Figure 9:
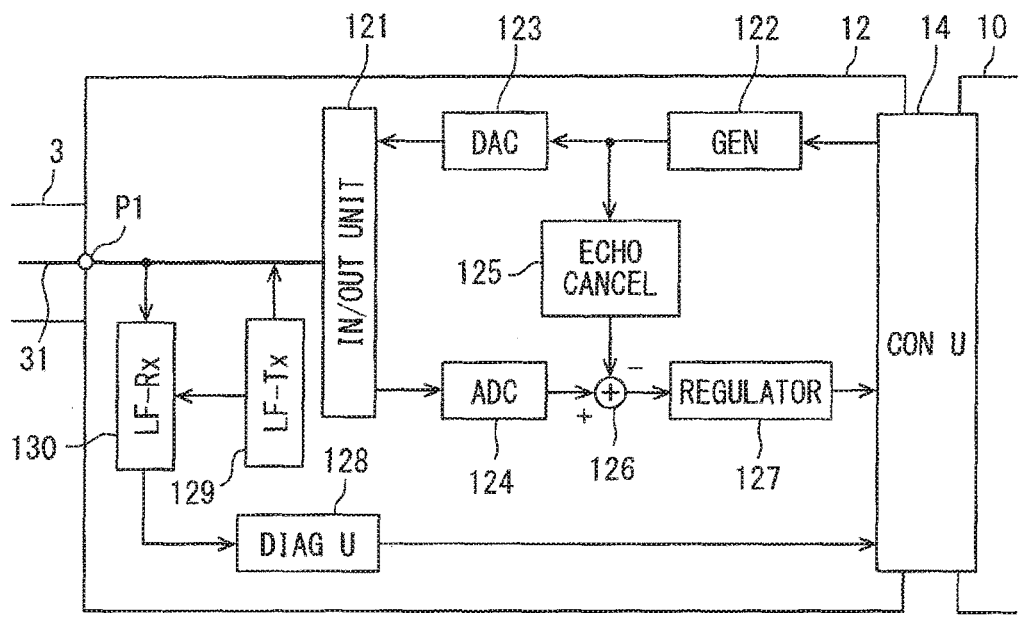
FIG. 9 is a diagram illustrating a configuration of a communication unit according to a second embodiment.

As shown in FIG. 9, a communication unit 12 according to the present embodiment includes, as components corresponding to one target signal line 31, an input and output unit 121, a generator 122, a DAC 123, an ADC 124, an echo canceller 125, a subtractor 126, a regulator 127, a diagnosis unit 128, a low frequency signal transmission unit 129, and a low frequency signal receiving unit 130.

The low frequency signal transmission unit 129 is a circuit module that supplies a signal (hereinafter referred to as a low frequency signal) having a frequency sufficiently lower than a frequency (hereinafter referred to as a communication frequency) used for a data communication between ECUs 2 to a target signal line 31. The frequency sufficiently lower than the communication frequency is a frequency cut off by a high-pass filter of the input and output unit 121 (that is, a frequency equal to or lower than a cutoff frequency). For the sake of convenience hereinafter, a frequency range sufficiently lower than the communication frequency is referred to as a low frequency band. In this example, the frequency band below 100 kHz corresponds to the low frequency band.

The low frequency signal transmission unit 129 is disposed closer to a connection cable 3 side than the input and output unit 121, that is, between a connection point P1 and the input and output unit 121. The connection point P1 is a point where the target signal line 31 and a circuit board on which the communication unit 12 is provided are electrically connected to each other. According to the configuration described above, since the low frequency signal supplied to the target signal line 31 by the low frequency signal transmission unit 129 is removed by the high-pass filter of the input and output unit 121, the lower frequency signal does not affect the data communication between the ECUs 2.

Further, the low frequency signal transmission unit 129 is configured to be capable of outputting signals of multiple frequencies belonging to the low frequency band. Specifically, the low frequency signal transmission unit 129 is configured to be capable of outputting the signals of two frequencies including a first frequency Lf1 and a second frequency Lf2 belonging to the low frequency band, and is configured to output one of the first frequency Lf1 and the second frequency L12. Specific values of the first frequency Lf1 and the second frequency Lf2 may be appropriately designed. Which one of the first frequency Lf1 and the second frequency Lf2 is output is determined in cooperation with the low frequency signal receiving unit 130.

In the present embodiment, the low frequency signal transmission unit 129 is configured to be capable of outputting the signals of two frequencies as an example, but the number of frequencies that can be output by the low frequency signal transmission unit 129 is not limited to two. The low frequency signal transmission unit 129 may be configured to be capable of outputting the signals of three or more frequencies. For example, it is preferable that the low frequency signal transmission unit 129 is configured to be capable of outputting signals having four or more frequencies.

The low frequency signal receiving unit 130 is a circuit module that receives a signal having a low frequency band (that is, a low frequency signal) supplied to the target signal line 31. Similarly to the low frequency signal transmission unit 129, the low frequency signal receiving unit 130 is disposed closer to the connection cable 3 side than the input and output unit 121. The low frequency signal receiving unit 130 has a function of specifying the frequency of the low frequency signal applied to the target signal line 31. In other words, the low frequency signal receiving unit 130 determines whether the signal of the first frequency Lf1 is flowing into the target signal line 31, or not, and whether the signal of the second frequency Lf2 is flowing, or not. The configuration for analyzing and specifying the frequency of the received signal may be realized with the use of a well-known configuration. For example, the low frequency signal receiving unit 130 may include a circuit for receiving the signal having the first frequency Lf1 and a circuit for receiving the signal having the second frequency Lf2, to thereby identify whether the signals of the respective frequencies are flowing, or not.

When the communication cable 3 is connected to the communication unit 12, the low frequency signal transmission unit 129 and the low frequency signal receiving unit 130 described above determine the frequency of the signal output to the target signal line 31 by the low frequency signal transmission unit 129, for example, in the following procedure.

First, the low frequency signal transmission unit 129 stops the output of the low frequency signal for a random time while the low frequency signal receiving unit 130 analyzes a frequency component of the low frequency signal flowing through the target signal line 31. The low frequency band signal observed when the transmission of the low frequency signal by the low frequency signal transmission unit 129 is stopped corresponds to the low frequency signal transmitted to the target signal line 31 by the other device. In other words, based on the signal received while the low frequency signal transmission unit 129 stops the output of the low frequency signal, the low frequency signal receiving unit 130 identifies the frequency (hereinafter referred to as the other device use frequency) of the low frequency signal transmitted from the other device.

Figure 10:
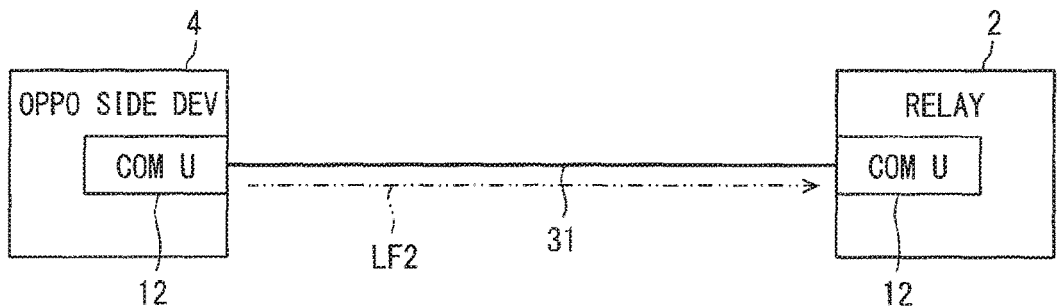
FIG. 10 is a diagram illustrating operation of a low frequency signal transmission unit and a low frequency signal receiving unit.
Figure 11:
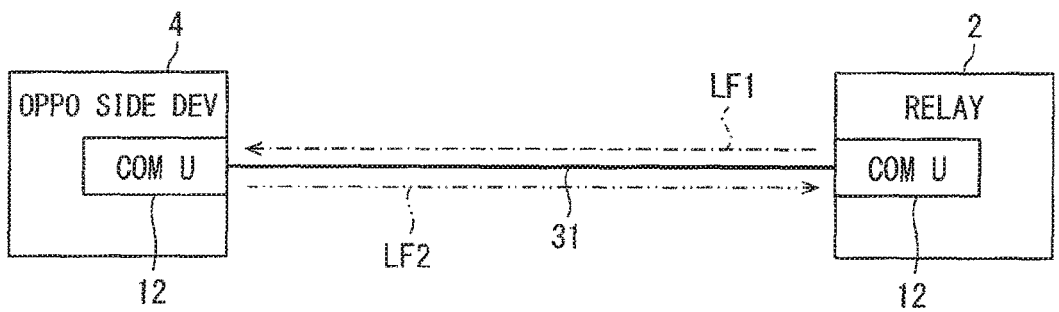
FIG. 11 is a diagram illustrating the operation of the low frequency signal transmission unit and the low frequency signal receiving unit.

The low frequency signal receiving unit 130 notifies the low frequency signal transmission unit 129 of the other device use frequency specified by the above processing. The low frequency signal transmission unit 129 outputs a signal having a frequency different from the other device use frequency notified from the low frequency signal receiving unit 130. For example, as shown in FIG. 10, when the other device is outputting the signal of the second frequency Lf2, the low frequency signal transmission unit 129 outputs the signal of the first frequency Lf1 as the low frequency signal as shown in FIG. 11. The low frequency signal transmission unit 129 cannot receive the low frequency signal from the other device even if the transmission of the low frequency signal is stopped only for the random time, and if the other device use frequency cannot be specified, the low frequency signal transmission unit 129 may output a signal of a frequency determined based on random or predetermined rules.

According to the configuration described above, the low frequency signal transmission unit 129 transmits the low frequency signal using the frequency different from that of the low frequency signal transmitted by the other device. As a result, two types of low frequency signals are superimposed on the target signal line 31. The frequency of the low frequency signal ultimately transmitted by the low frequency signal transmission unit 129 (hereinafter referred to as the host device use frequency) may be set to a frequency different from the other device use frequency, and a method of determining the host device use frequency is not limited to the method described above. For example, the relay device 1 may communicate with the other device to adjust the frequency used for transmission of the low frequency signal so as not to overlap with each other.

Further, the host device use frequency to be applied for the first time after the connection of the communication cable 3 may be determined according to random and predetermined rules. In that case, if only one type of frequency is observed by the low frequency signal receiving unit 130 even after a predetermined time has elapsed since the start of the transmission of the low frequency signal, the host device frequency is changed at the timing when the random time elapses. This is because when only one kind of frequency is observed even after a predetermined time has elapsed since the start of the transmission of the low frequency signal, there is a possibility that the other device use frequency and the host device use frequency coincide with each other.

As a case where only one kind of frequency (more specifically, the host device use frequency) is observed, there is a possibility that the target signal line has been disconnected. However, when the target signal line 31 is not disconnected, it can be expected that two kinds of frequencies are observed by sequentially changing the host device use frequency. In other words, the host device use frequency is sequentially changed, thereby being capable of distinguishing between a case where the target signal line 31 is disconnected and a case where the use frequency is overlapped with each other.

In addition, the diagnosis unit 128 according to the present embodiment detects the instantaneous disconnection of the target signal line 31 based on a reception status of the low frequency signal of the other device use frequency in the low frequency signal receiving unit 130, and performs the diagnosis of the connection state. Specifically, the diagnosis unit 128 sequentially acquires whether the signal of the other device use frequency can be received from the low frequency signal receiving unit 130, or not. When the signal of the other device use frequency can be no longer detected from a state where the signal of the other device use frequency can be detected, the diagnosis unit 128 determines that the instantaneous disconnection or disconnection has occurred. If the signal of the other device use frequency can be received again within the predetermined upper limit time after the signal of the other device use frequency can be no longer detected, the diagnosis unit 128 determines that the instantaneous disconnection has occurred and updates the instantaneous disconnection history data. The configuration for determining whether there is a sign of disconnection, or not, with the use of the instantaneous disconnection history data is the same as that in the first embodiment. The diagnosis unit 128 determines that the disconnection has occurred if the signal of the other device use frequency cannot be received again within the predetermined upper limit time after the signal of the other device use frequency can be no longer received.

Even with the configuration described above, it can be determined whether the target signal line 31 is likely to be disconnected (that is, a sign of disconnection), or not, as in the first embodiment.

In the above description, the configuration in which each of the two communication units 12 connected to both ends of one signal line 31 diagnoses the corresponding signal line 31 has been disclosed, but the present invention is not limited to the above configuration. One of the two communication units 12 connected to both ends of one signal line 31 may be determined as a transmission side device and the other may be determined as a receiving side device so that only the transmission side device transmits the low frequency signal. In that case, only the receiving side device performs a diagnosis process based on whether the low frequency signal is flowing into the target signal line 31, or not. Which of the two communication units 12 is to be the transmission side device may be determined according to the order in which the communication cables 3 are connected, a mutual communication, or the like.

Third Embodiment

Next, a vehicle communication system 100 according to a third embodiment of the present invention will be described with reference to the drawings. The members having the same functions as those in the members described in the above first embodiment are denoted by the identical reference numerals, and a description of the same members will be omitted. Further, when referring to only a part of the configuration, the configuration of the embodiment described above can be applied to other portions.

Figure 12:
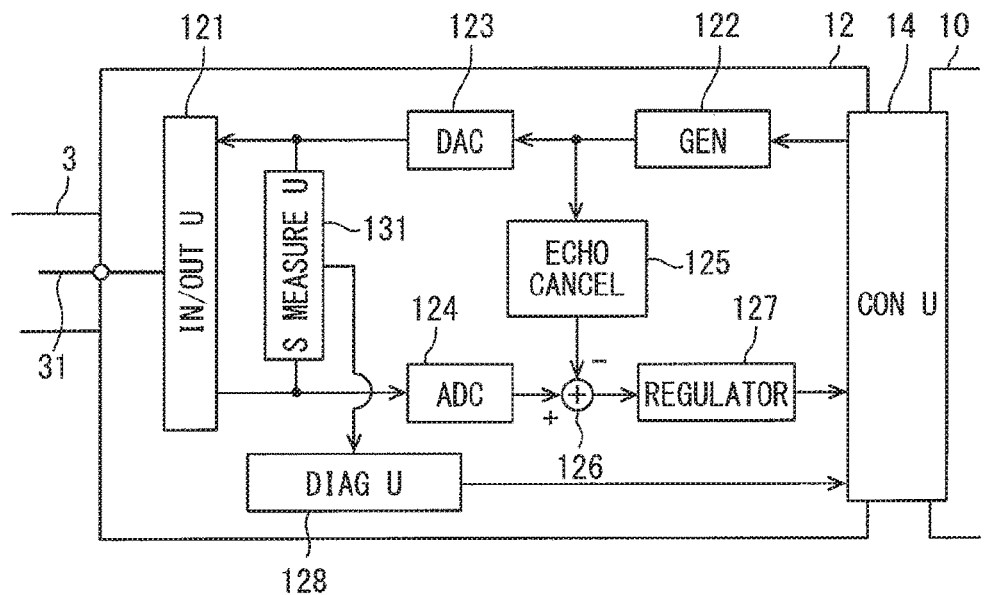
FIG. 12 is a diagram illustrating a configuration of a communication unit according to a third embodiment.

As shown in FIG. 12, a communication unit 12 according to the present embodiment includes, as components corresponding to one target signal line 31, an input and output unit 121, a generator 122, a DAC 123, an ADC 124, an echo canceller 125, a subtractor 126, a regulator 127, a diagnosis unit 128, and an S parameter measurement unit 131.

The S parameter measurement unit 131 is configured to measure an S parameter indicating an electric characteristic of a target signal line 31. The S parameter measurement unit 131 may be realized with the use of a configuration well known as a network analyzer. In other words, the S parameter measurement unit 131 inputs a signal of a predetermined frequency (hereinafter referred to as a detection signal) for detecting the electric characteristic of a transmission line to the DAC 123, and measures the S parameter with reference to the output signal of the ADC 124 corresponding to the detection signal.

The S parameter may be data indicating a variation in a phase of an output signal of the ADC 124 relative to a detection signal input to the DAC 123 for each frequency when sweeping a frequency of the detection signal in a range of 30 kHz to 3 GHz. In that case, the S parameter may be expressed in a vector with the phase change for each frequency as an element. Further, the S parameter may be data indicating a ratio of an amplitude of the output signal of the ADC 124 to the detection signal input to the DAC 123, or the variation of the phase. In that case, the S parameter may be expressed in a vector with the amplitude ratio and the phase change as elements.

For example, when the generator 122 is not outputting data, the S parameter measurement unit 131 outputs the detection signal to measure the S parameter. In the present embodiment, as an example, it is assumed that the S parameter measurement unit 131 is configured to periodically measure the S parameter in a predetermined measurement cycle. Further, it is assumed that the generator 122 is configured to stop the output of the symbols when the S parameter measurement unit 131 measures the S parameter. In another aspect, the data output by the generator 122 may be prioritized over the measurement of the S parameter. The S parameter measurement unit 131 sequentially provides data indicative of the measured S parameter to the diagnosis unit 128.

The diagnosis unit 128 according to the third embodiment determines whether a disconnection is likely to occur, or not, based on a temporal change of the S parameter measured by the S parameter measurement unit. For example, the diagnosis unit 128 compares a sign pattern, which is a fluctuation pattern of the S parameter observed before the disconnection occurs, with the fluctuation pattern of the actually observed S parameter, and determines that there is a sign of disconnection when the coincidence degree is equal to or larger than a predetermined threshold. The sign pattern may be specified in advance by testing or the like and registered as model data in a nonvolatile storage medium such as a ROM.

As another embodiment, when a reflection coefficient of a transmission line observed as the S parameter is equal to or higher than the predetermined level, it may be determined that there is a sign of disconnection. This is because when the target signal line 31 is likely to be disconnected, it can be expected that the reflection coefficient of the transmission line will be high.

Furthermore, when a variation width per unit time when multiple S parameters acquired at multiple time points are arranged in chronological order is equal to or larger than a predetermined threshold, it may be determined that there is a sign of the disconnection. When the target signal line 31 is likely to be disconnected, the occurrence frequency of the instantaneous disconnection can be increased. It is assumed that the values of various elements configuring the S parameter vary relatively greatly between the S parameter in the case of an instantaneous disconnection and the S parameter in the absence of an instantaneous disconnection. Therefore, the sign of disconnection can also be detected according to the fluctuation range of the S parameter.

According to the configuration described above, as in the first and second embodiments, it can be determined whether the target signal line 31 is likely to be disconnected, or not. In addition, according to the configuration described above, the diagnosis unit 128 can acquire multiple kinds of information such as a return loss indicating a degree of attenuation of a transmission signal in a transmission process, for example, in addition to detecting the sign of disconnection.

Modification 1

The communication unit 12 may include a circuit breaker 132 that disconnects the target signal line 31 from the communication unit 12 based on the diagnosis result of the diagnosis unit 128. The circuit breaker 132 disconnects the target signal line 31 from the communication unit 12, for example, when the diagnosis unit 128 detects a disconnection or a sign of disconnection of the target signal line 31. The circuit breaker 132 is configured to switch an electric connection state between the target signal line 31 and the input and output unit 121 to another, and may be realized with the user of a switch, a relay, or the like.

Figure 13:
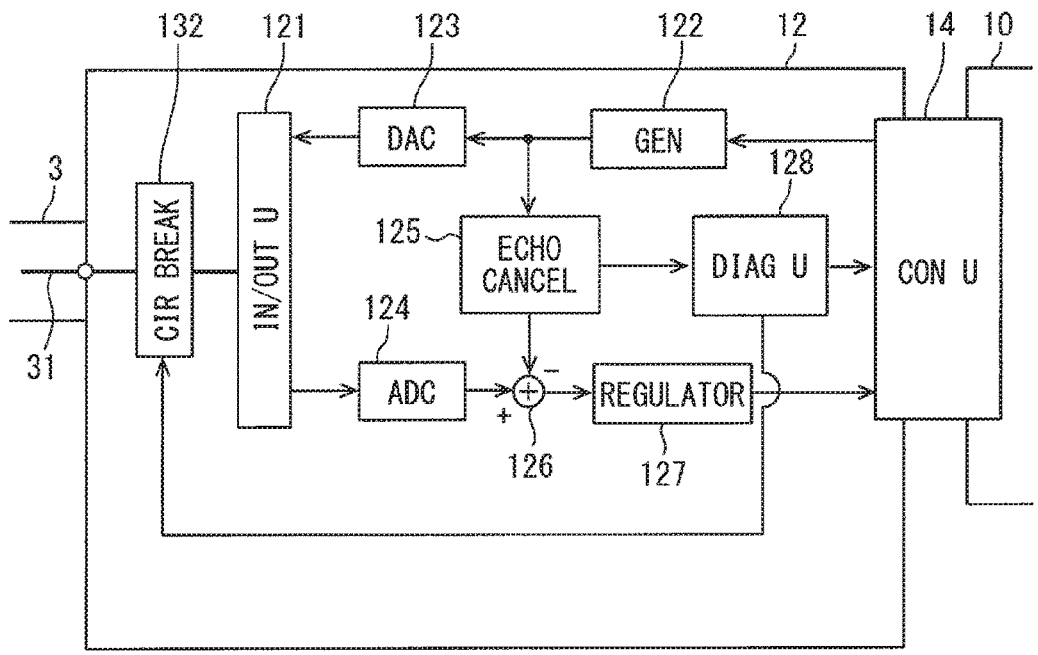
FIG. 13 is a diagram illustrating a configuration of a communication unit according to a modification.

With the provision of such a circuit breaker 132, even when the target signal line 31 is disconnected, it is possible to reduce the possibility of occurrence of a failure (that is, a secondary failure) of another circuit due to a short circuit or the like after the disconnection. FIG. 13 shows a configuration in which the circuit breaker 132 is disposed in the communication unit 12 of the first embodiment, but the circuit breaker 132 can also be applied to the communication unit 12 of the second embodiment and the third embodiment.

Modification 2

Further, the main control unit 10 may have a function of switching the output destination of the signal to the communication cable 3 for which no sign of disconnection is detected based on the diagnosis result of the diagnosis unit 128. Hereinafter, such a configuration will be described as Modification 2.

Figure 14:
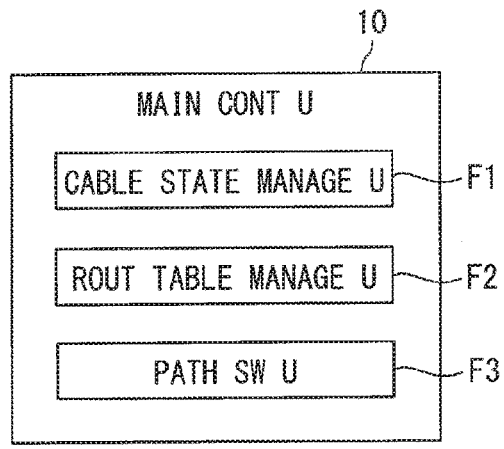
FIG. 14 is a block diagram illustrating a configuration of a main control unit according to a modification.

As shown in FIG. 14, the main control unit 10 according to Modification 2 includes a cable state management unit F1, a routing table management unit F2, and a path switching unit F3. The respective functions of the main control unit 10 are realized by the execution of software by the CPU 101. In another aspect, some or all of the functions of the main control unit 10 may be realized as hardware using a logic circuit or the like. The mode realized as hardware includes a mode realized with the use of one or multiple ICs. Part or all of the functional blocks included in the main control unit 10 may be realized by a combination of software execution by the CPU 101 and electronic circuits.

The cable state management unit F1 updates the contents of data (hereinafter referred to as cable management data) indicating the state of all the communication cables 3 connected to the host device based on the diagnosis result provided from the diagnosis unit 128 of each communication unit 12. An item indicating a state of the communication cable 3 includes whether a sign of disconnection is detected in the communication cable 3, or not. In the case where at least one of the two signal lines 31 of a certain communication cable 3 has been determined to have a sign of disconnection, the cable state management unit F1 treats the communication cable 3 as the communication cable 3 in which the sign of disconnection is detected (hereinafter referred to as quasi-disconnected cable).

Further, as a more preferable mode in the present embodiment, an item indicating the state of the communication cable 3 also includes whether the communication cable 3 is disconnected, or not. Whether the communication cable 3 is disconnected, or not, may be acquired from the diagnosis unit 128 of each communication unit 12. Cable management data indicating the above items for each communication cable 3 is stored in the RAM 102 and is updated successively each time a diagnosis result is acquired from the diagnosis unit 128. It is assumed that the information on each communication cable 3 is associated with a port number to which the communication cable 3 is connected.

The routing table management unit F2 is configured to update and hold data (that is, routing table) indicating path information of the network. The routing table is data in which, for example, a network address of the ECU 2 set as a destination is associated with an output port number as a transfer destination when data addressed to the ECU 2 is acquired. The routing table may be stored in the RAM 102 or the like.

The routing table may be updated every time the ECU 2 is connected and disconnected to and from the communication network provided by the vehicle communication system 100. Also, when the relay device 1 and the communication cable 3 are added or deleted, the routing table may be updated similarly. In other words, the routing table may be updated every time the network topology is changed. Sharing the routing information between the respective relay device 1 and dynamically updating the routing table (so-called dynamic routing) may be carried out with the use of a well-known method such as an RIP (Routing Information Protocol).

Figure 15:
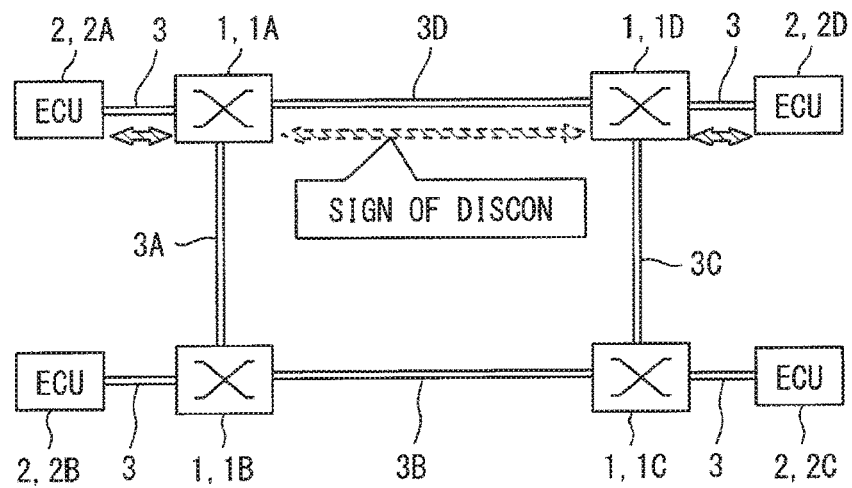
FIG. 15 is a diagram illustrating the operation of the main control unit according to the modification.

The path switching unit F3 is configured to perform a process of switching the transmission path (in other words, communication path) of data from one ECU 2 to another ECU 2 based on the state of each communication cable 3 indicated in the cable management data. The path switching unit F3 changes the communication path between the respective ECUs 2 in cooperation with the routing table management unit F2. The operation of the path switching unit F3 will be described with reference to FIGS. 15 and 16. FIG. 15 is a diagram showing a state in which a path using the communication cable 3D is set as a data transmission path between the ECU 2A and the ECU 2D.

In a state where a path shown in FIG. 15 is applied as a communication path between the ECU 2A and the ECU 2D, when the diagnosis unit 128 of the relay device 1A detects a sign of disconnection in the communication cable 3D, the path switching unit F3 of the relay device 1A sets a path without using the communication cable 3 as a communication path between the ECU 2A and the ECU 2D. Specifically, the path switching unit F3 sets the output destination of the data addressed to the ECU 2D to the communication cable 3A. New communication path information determined by the path switching unit F3 is promptly reflected in the routing table managed by the routing table management unit F2.

Figure 16:
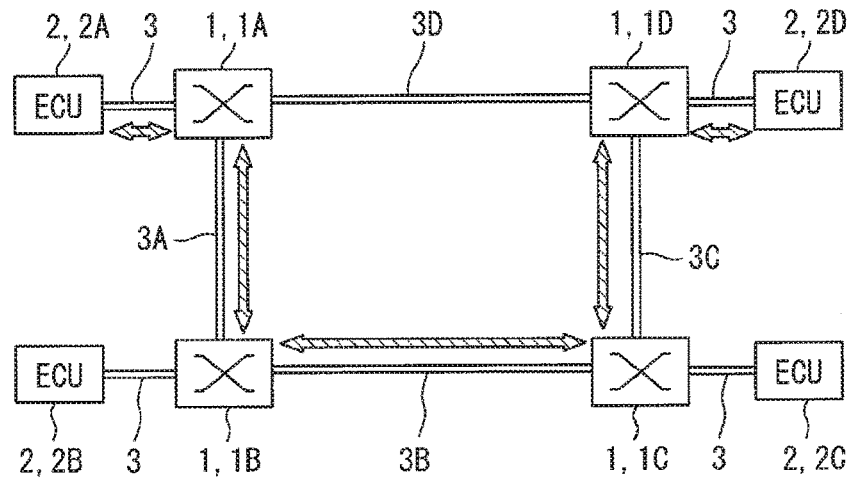
FIG. 16 is a diagram illustrating the operation of the main control unit according to the modification.

Further, the path switching unit F3 of the relay device 1A broadcasts routing information instructing other relay devices 1 to refrain from using the communication cable 3D. As a result, the routing table is updated by not only in the relay device 1A but also in the relay devices 1B, 1C, and 1D, as a result of which, as a communication path between the ECU 2A and the ECU 2D, a path detouring the communication cable 3 is generated as shown in FIG. 16.

According to the configuration described above, since the communication path is switched before the disconnection actually occurs, the possibility of the communication failure between the respective ECUs 2 can be reduced. In other words, the reliability of the communication network can be improved. In the description described above, the operation of the path switching unit F3 has been described by way of example in which the sign of disconnection is detected in a certain communication cable 3. However, even in the case where the disconnection is detected, the path switching unit F3 operates in the same manner.

Modification 3

Figure 17:
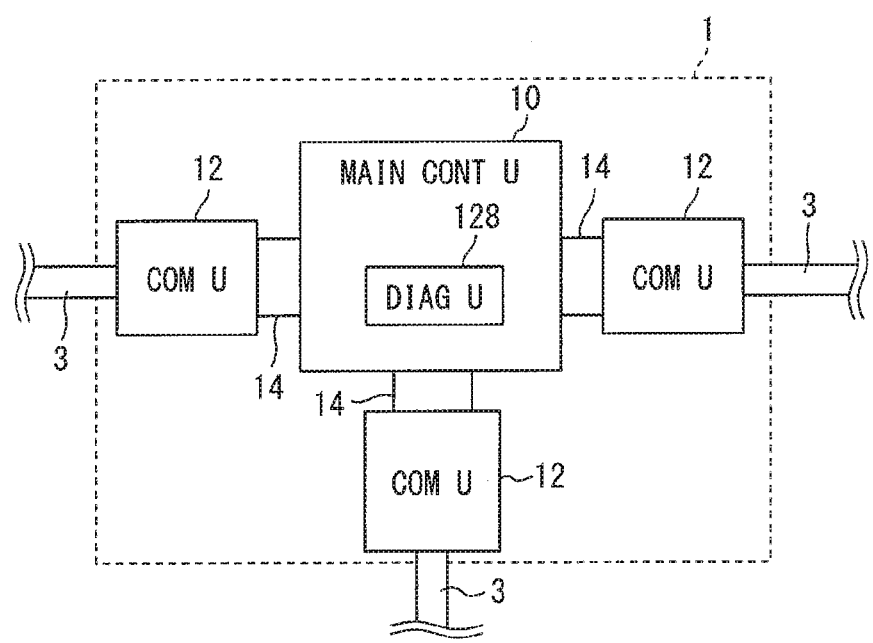
FIG. 17 is a diagram illustrating the configuration of the main control unit according to the modification.

In the various embodiments described above, the configuration in which the diagnosis unit 128 is provided in the communication unit 12 has been disclosed, but the present invention is not limited to the above configuration. As shown in FIG. 17, the diagnosis unit 128 may be included in the main control unit 10. In that case, the main control unit 10 acquires information for determining whether there is a sign of disconnection, or not, from each communication unit 12, and performs the connection state diagnosis process.

It is noted that a flowchart or the processing of the flowchart in the present application includes sections (also referred to as steps), each of which is represented, for instance, as S1, Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A relay device for relaying data between a plurality of communication cables having at least one signal line in a vehicle communication system for providing a communication protocol with a full duplex communication through the at least one signal line, the relay device comprising:
   a plurality of communication units that are connected to the plurality of communication cables, respectively; and
   a main controller, comprising a processor and a memory, that is mutually connectable to the plurality of communication units, and executes a relay process of relaying the data between the plurality of communication units, wherein:
   each of the plurality of communication units includes:
      an input and output unit that inputs and outputs an analog signal through the at least one signal line of one of the plurality of communication cables which is defined as a connection cable and is connected to one of the plurality of communication units;
      an analog-to-digital converter that converts the analog signal output from the input and output unit into a digital signal, and outputs the digital signal;
      a generator that generates an other digital signal to be output to the at least one signal line based on an other analog signal input to an other one of the plurality of communication units; and
      an echo canceller that:
         sequentially calculates a filter coefficient to be used in an adaptive filter based on the other digital signal output from the generator and the digital signal output from the analog-to-digital converter, and
         executes a cancellation process of removing a component of the digital signal from the digital signal according to the filter coefficient, the component of the digital signal being derived from the other digital signal of the generator; and
   the one of the plurality of communication units or the main controller includes a sign determination unit that:
      determines based on a time change of the filter coefficient determined by the echo canceller whether a sign of disconnection, indicating whether the at least one signal line is likely to be disconnected, exists in the at least one signal line connected to the one of the plurality of communication units including the echo canceller, and
      determines that the sign of disconnection exists when an occurrence frequency of an instantaneous disconnection is equal to or more than a predetermined threshold value.

2. The relay device according to claim 1, wherein:
the main controller further includes:
   a cable state management unit that stores a determination result of the sign determination unit;
   a routing table management unit that manages a routing table indicating a relationship between a destination of a received data and the one of the plurality of communication cables as an output destination of the received data; and
   a path switch that switches the output destination of the received data to an other one of the plurality of communication cables other than a semi-disconnected communication cable when the sign determination unit determines as the semi-disconnected communication cable that the sign of disconnection exists in the one of the plurality of communication cable connected to the relay device, and the routing table sets path information that the semi-disconnected cable is the output destination of the received data.

3. The relay device according to claim 1, wherein:
each of the plurality of communication units further includes a circuit breaker that disconnects the one of the plurality of communication units, connected to the one of the plurality of communication cables in which the sign of disconnection exists, from the one of the plurality of communication cables.

4. The relay device according to claim 1, wherein:
the sign determination unit determines that the sign of disconnection exists when the filter coefficient remains a same value for a predetermined time period.

5. The relay device according to claim 1, wherein:
the sign determination unit determines that the instantaneous disconnection occurs when the filter coefficient remains a same value for a predetermined time period.

6. The relay device according to claim 1, wherein:
the sign determination unit determines that the instantaneous disconnection occurs when the filter coefficient remains a same value for a predetermined time period, and
the filter coefficient is updated within a predetermined time limit since the filter coefficient remains the same value.

7. A relay device for relaying data between a plurality of communication cables having at least one signal line in a vehicle communication system for providing a communication protocol with a full duplex communication through the at least one signal line, the relay device comprising:
   a plurality of communication units that are connected to the plurality of communication cables, respectively; and
   a main controller, comprising a processor and a memory, that is mutually connectable to the plurality of communication units, and executes a relay process of the data between the plurality of communication units, wherein:
   each of the plurality of communication units includes:
      an input and output unit that inputs and outputs an analog signal through the at least one signal line of one of the plurality of communication cables which is defined as a connection cable and is connected to one of the plurality of communication units;

a low frequency signal transmitter that outputs a low frequency signal, which has a frequency lower than a frequency of a data communication, through the at least one signal line; and a low frequency signal receiving unit that receives an other low frequency signal outputted through the at least one signal line from an other relay device connected at an opposite end of the at least one signal line; and the one of the plurality of communication units or the main controller includes a sign determination unit that:
  detects an instantaneous disconnection of the at least one signal line connected to the low frequency signal receiving unit based on a reception state of the other low frequency signal in the low frequency signal receiving unit,
  determines based on an occurrence frequency of the instantaneous disconnection whether a sign of disconnection, indicating whether the at least one signal line is likely to be disconnected, exists in the one of the plurality of communication cables including the at least one signal line, and
  determines that the sign of disconnection exists when an occurrence frequency of an instantaneous disconnection is equal to or more than a predetermined threshold value.

8. The relay device according to claim 7, wherein:
the main controller further includes:
  a cable state management unit that stores a determination result of the sign determination unit;
  a routing table management unit that manages a routing table indicating a relationship between a destination of a received data and the one of the plurality of communication cables as an output destination of the received data; and
  a path switch that switches the output destination of the received data to an other one of the plurality of communication cables other than a semi-disconnected communication cable when the sign determination unit determines as the semi-disconnected communication cable that the sign of disconnection exists in the one of the plurality of communication cable connected to the relay device, and the routing table sets path information that the semi-disconnected cable is the output destination of the received data.

9. The relay device according to claim 7, wherein:
each of the plurality of communication units further includes a circuit breaker that disconnects the one of the plurality of communication units, connected to the one of the plurality of communication cables in which the sign of disconnection exists, from the one of the plurality of communication cables.

10. The relay device according to claim 7, wherein:
the sign determination unit determines that the sign of disconnection exists when the low frequency signal receiving unit can no longer detect the other low frequency signal from a state where the low frequency signal receiving unit detects the other low frequency signal.

11. A relay device for relaying data between a plurality of communication cables having at least one signal line in a vehicle communication system for providing a communication protocol with a full duplex communication through the at least one signal line, the relay device comprising:

a plurality of communication units that are connected to the plurality of communication cables, respectively; and a main controller, comprising a processor and a memory, that is mutually connectable to the plurality of communication units, and executes a relay process of the data between the plurality of communication units, wherein:

each of the plurality of communication units includes an S parameter measurement unit that outputs a predetermined detection signal through the at least one signal line of one of the plurality of communication cables which is defined as a connection cable and is connected to one of the plurality of communication units, and measure an S parameter indicative of an electric characteristic of the at least one signal line; and the one of the plurality of communication units or the main controller includes a sign determination unit that:
  determines based on a time change of the S parameter measured by the S parameter measurement unit whether a sign of disconnection, indicating whether the at least one signal line is likely to be disconnected, exists in the one of the plurality of communication cables connected to the one of the plurality of communication units including the S parameter measurement unit, and
  determines that the sign of disconnection exists when an occurrence frequency of an instantaneous disconnection is equal to or more than a predetermined threshold value.

12. The relay device according to claim 11, wherein:
the main controller further includes:
  a cable state management unit that stores a determination result of the sign determination unit;
  a routing table management unit that manages a routing table indicating a relationship between a destination of a received data and the one of the plurality of communication cables as an output destination of the received data; and
  a path switch that switches the output destination of the received data to an other one of the plurality of communication cables other than a semi-disconnected communication cable when the sign determination unit determines as the semi-disconnected communication cable that the sign of disconnection exists in the one of the plurality of communication cables connected to the relay device, and the routing table sets path information that the semi-disconnected cable is the output destination of the received data.

13. The relay device according to claim 11, wherein:
each of the plurality of communication units further includes a circuit breaker that disconnects the one of the plurality of communication units, connected to the one of the plurality of communication cables in which the sign of disconnection exists, from the one of the plurality of communication cables.

14. The relay device according to claim 11, wherein:
the sign determination unit determines that the sign of disconnection exists when at least one of three conditions is satisfied;
the three conditions include a first condition that a coincidence degree between a sign pattern and a fluctuation pattern is equal to or larger than a predetermined threshold;

the three conditions include a second condition that a variation width of the S parameter acquired at multiple time points is equal to or larger than a predetermined threshold; and the three conditions include a third condition that a reflection coefficient of the at least one signal line observed as the S parameter is equal to or higher than a predetermined level.

\* \* \* \* \*